United States Patent [19]
Phillips et al.

[11] Patent Number: 5,806,821
[45] Date of Patent: Sep. 15, 1998

[54] POSITIONABLE SUPPORT HEAD

[75] Inventors: Edward Phillips; Thomas Pfeiffer, both of Burbank, Calif.

[73] Assignee: Matthews Studio Equipment, Inc., Burbank, Calif.

[21] Appl. No.: 634,157

[22] Filed: Mar. 28, 1996

[51] Int. Cl.$^6$ ..................................................... A47F 5/00
[52] U.S. Cl. ............................... 248/288.51; 248/181.1; 403/90; 403/122
[58] Field of Search ............................. 248/181.1, 181.2, 248/288.31, 288.51; 403/122, 90, 362

[56] References Cited

U.S. PATENT DOCUMENTS

| | | | |
|---|---|---|---|
| 431,036 | 7/1890 | Dawson | 248/181.1 X |
| 872,139 | 11/1907 | Mentzer | 248/181.1 X |
| 4,579,009 | 4/1986 | Carmichael et al. | 403/90 X |
| 5,279,488 | 1/1994 | Fleming | 248/181.1 X |
| 5,419,522 | 5/1995 | Luecke et al. | 248/288.51 |

FOREIGN PATENT DOCUMENTS

1112908 A   3/1956   France ................................ 248/181.1

*Primary Examiner*—Derek J. Berger
*Attorney, Agent, or Firm*—Michael A. Painter

[57] ABSTRACT

A coupling for mounting and positioning photographic, motion picture and video accessories and the like. A receiving base couples the positioning head to an equipment stand shaft, the receiving base being rotatable about the axis of the stand shaft. A first terminus of the receiving base incorporates an axially oriented beveled surface which is disposed within a cylindrical bore disposed through the head housing. The receiving base is maintained within the cylindrical bore in the housing through the engagement of and the force imposed thereon by an impinging stud bearing upon the beveled surface. A support post is mounted within the cylindrical bore of the housing extending outwardly in opposition to the receiving base. The end of the support shaft extending from the housing is fully rotatable about its interface with the housing. The engagement of the impinging stud against the beveled surface of the receiving base places the adjacent ends of the receiving base and support shaft in frictional engagement permitting the support shaft to be secured in a desired position.

9 Claims, 2 Drawing Sheets

POSITIONABLE SUPPORT HEAD

BACKGROUND OF THE INVENTION

1. Field of the Invention

The present invention generally relates to mechanical coupling devices, and more particularly to coupling apparatus used to positionally support photographic, motion picture and video accessories.

2. Prior Art

As the photographic, motion picture and television industries have developed, the demand for equipment which would enhance the final product has increased. This has led to the use of accessories which are integral and necessary to the filming and/or recording of visual and audible images. These accessories are, for example, such items as light reflectors, filters and microphones. The effective use of these accessories requires that they be placed in precisely the correct location to permit optimum recording of visual images and/or sound.

The prior art exhibits innumerable classes and types of equipment to support and mount photographic and sound accessories. The most basic designs require each accessory to be mounted individually. Each accessory needed was required to be individually placed adjacent the visual scene or audio source involved. Even if the accessory could be flexibly positioned upon the supporting device, the inherent nature of the design rendered it inadequate. In addition, in many situations accessories must be used in environments having limited available space. This substantially limits the manner of use of each accessory and adversely affects the final product.

Another design exhibited by the prior art permits a plurality of accessories to be mounted or otherwise supported upon an individual stand or pedestal. Although this tends to resolve the problem created by spatial limitations, it fails to address the need to provide positional flexibility to the placement of each accessory.

The present invention resolves those problems inherent in the devices disclosed by the prior art. The positional support head is adapted to be coupled to a conventional stand or pedestal used by the photograph, motion picture and television industries. A typical stand employs a stable tripod upon which a cylindrical riser is vertically or horizontally extended. The present invention is adapted to be secured to the vertical or horizontal riser or shaft, or a coupling which is affixed thereto.

The present invention comprises a head housing having a cylindrical bore disposed longitudinally therethrough. An accessory support shaft depends into an axially aligned positioning sphere at one end thereof. The positioning sphere is rotatably coupled and positioned at one end of the cylindrical bore of the head housing, the shaft extending outwardly from the housing. The receiving base comprises a substantially cylindrical shaft depending at one end thereof into a receiver to be coupled to the pedestal shaft, the opposite end depending into an interfacing surface which is adapted to frictionally engage the positioning sphere. The interfacing surface of the receiving base is disposed within the cylindrical bore and placed adjacent the positioning sphere. An impinging stud is adjustably disposed through the housing wall and is adapted to impose force upon the receiving base, a component of the force axially urging the interfacing surface toward the positioning sphere. When the impinging stud is firmly seated in engagement with the receiving base, the support shaft may be locked at any location along a semi-spherical surface having its center at the positioning sphere.

The receiving base is adapted to be secured to a riser or extension of a supporting stand. The accessory to be used is secured to the support shaft of the present invention. By altering the position of the receiving base relative to the riser and the support shaft relative to the housing, the three-dimensional orientation of an accessory may be rotatably positioned at any location within 180° of arc.

SUMMARY OF THE INVENTION

The present invention permits a photographic, motion picture or video accessory to be affixed to a conventional stand or pedestal and be oriented to maximize effective use. Although it is understood the present invention may be used to mechanically position any photographic, motion picture or television accessory, the present invention will be discussed in conjunction with a lighting filter for example only.

A substantially cylindrical support head housing has a cylindrical bore axially disposed therethrough. A receiving base incorporates at one end thereof a receiving member adapted to be coupled to the supporting stand or pedestal. A locking disc is disposed at the opposite end thereof, the locking disc being adapted to be slidably received within the cylindrical bore of the positioning head housing. A positioning sphere is rotatably positioned within the cylindrical bore, the positioning sphere being adapted to be positioned adjacent the locking disc. A support shaft depends from the cylindrical sphere and extends outwardly from the cylindrical bore. An impinging stud is disposed through the wall of the head housing and is adapted to engage the locking disc urging it toward the positioning sphere. When fully engaged, the positioning sphere and depending support shaft may be secured in any position along a spherical surface having its center at the positioning sphere.

It is therefore an object of the present invention to provide an improved positionable support head.

It is another object of the present invention to provide a positional support head which may be used to position theatrical accessories within 180° of arc.

It is still another object of the present invention to provide a positioning support head which may be coupled to equipment stand and pedestal risers.

It is still yet another object of the present invention to provide a positional support head which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
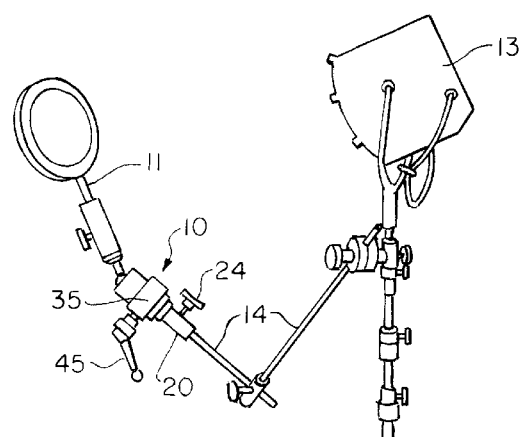
FIG. 1 is a perspective view of the present invention position support head coupled to an equipment stand in accordance with the present invention.

An understanding of the use of the present invention may be best gained by reference to FIG. 1 wherein the present invention positionable support head is generally designated by the reference numeral 10. The present invention is employed for the purpose of adjustably securing and positioning photographic, motion picture and video accessories. For the purpose of example only, FIG. 1 illustrates a light filter 11 being coupled to the positionable support head 10. The support head 10 is used in conjunction with conventional equipment stands 12 which do not form a part of the present invention. As shown in FIG. 1, equipment stand 12 illustrates an exemplary assembly which includes theatrical lights 13 and a plurality of extension shafts 14, one of which is coupled to positionable support head 10.

An understanding of the present invention positionable support head 10 may be best gained by reference to FIGS. 2, 3, 4 and 5. The support head 10 comprises an assembly of four essential elements. These include the receiving base 20, head housing 35, locking arm 45 and support shaft 60. The structure of each of these elements and their interrelationship is described in detail hereinbelow.

Receiving base 20 couples the present invention positionable support head 10 to an extension shaft 14. In the preferred form of the present invention, receiving base 20 comprises a sleeve 21 into which an axial, cylindrical bore 22 is longitudinally disposed. The opening 23 of cylindrical base 22 is adapted to receive an extension shaft 14 which is slidably inserted into cylindrical bore 22. Clamping knob 24 includes a conventional threaded shaft 25 which is adapted to engage mating threads formed in the wall 26 of a radial aperture disposed through sleeve 21. Clamping knob 24, when rotated inwardly into cylindrical bore 22 will secure sleeve 21 to extension shaft 14. Although the preferred form of the present invention illustrates receiving base 20 in a form which will receive and is adapted to be secured to a shaft, it is understood receiving base 21 could be implemented as a unitary shaft which could be coupled to a sleeve affixed to extension shaft 14.

In opposition to opening 23, sleeve 21 extends into axially aligned shaft 27. A locking disc 28 is axially secured to shaft 27 in opposition to sleeve 21. Locking disc 28 is a substantially cylindrical member having a uniformly beveled, frusto-conical surface 29 extending from the outer diameter of the locking disc 28 to its interface with shaft 27. The end surface 30 of locking disc 28 in opposition to beveled surface 29 is substantially a plane which is perpendicular to the longitudinal axis of sleeve 21, shaft 27 and locking disc 28. A partially spherical detent 31 is formed in end surface 30, detent 31 being aligned with the longitudinal axis of locking disc 28. As will be explained in detail hereinbelow, detent 31 is adapted to frictionally engage support shaft 60 and secure same in a desired position.

As described hereinabove, support shaft 60 is adapted to be coupled to and support a photographic, motion picture or video accessory which has been illustrated in the form of light filter 11. As can be best seen in FIG. 3, support shaft 60 comprises a cylindrical arm 61 which is adapted to be received by and coupled to conventional photographic, motion picture and video accessories, the illustrated form of arm 61 being for the purpose of example only.

To achieve the objectives of the present invention, a substantially spherical positioning member 62 extends from and is secured at one end of support arm 61 along the longitudinal axis thereof. The diameter of positioning sphere 62 is substantially equal to the diameter of locking disc 28. The radius of curvature of positioning sphere 62 is equal to the radius of curvature of detent 31. A plurality of serrations 63 are disposed upon the outer, surface of positioning sphere 62. As will be explained in detail hereinbelow, the serrated surface 63 of positioning sphere 62 enhances the frictional engagement between positioning sphere 62 and locking disc 28 thereby improving the ability to secure support shaft 60 in the appropriate position.

Figure 2:
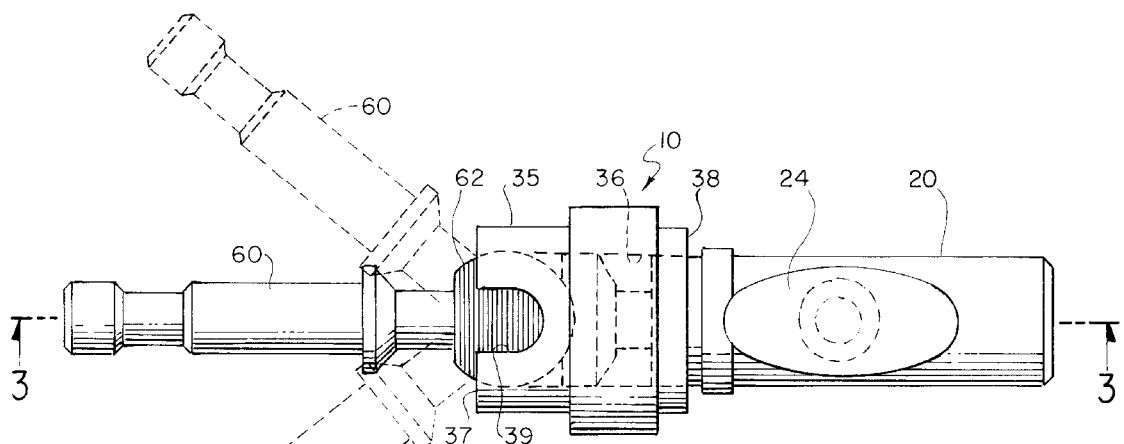
FIG. 2 is a top plan view of the positional support head illustrating the support shaft in variable positions.
Figure 3:
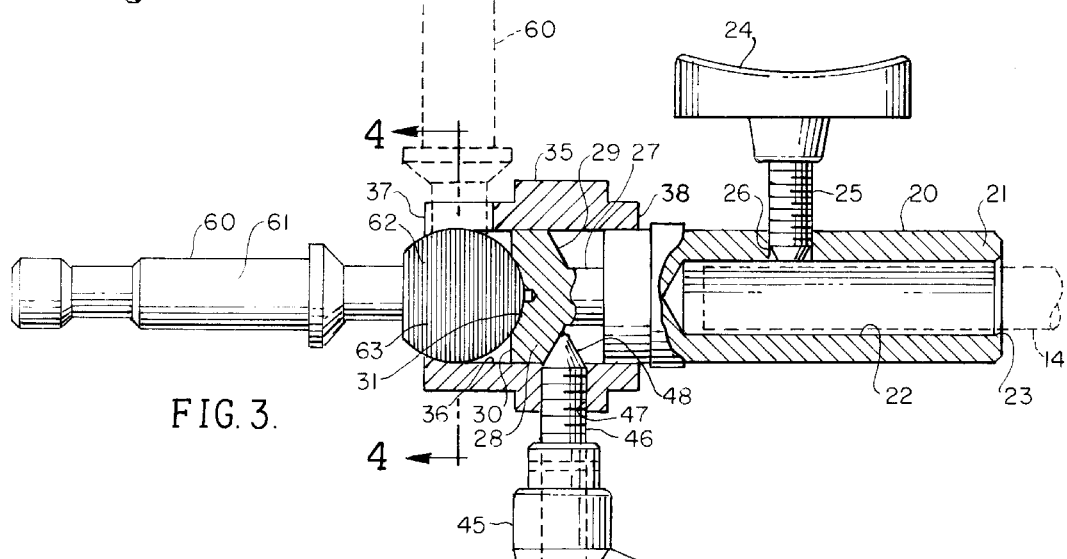
FIG. 3 is a partial cross-sectional view of the positional support head shown in FIG. 2 taken through line 3—3 of FIG. 2.
Figure 4:
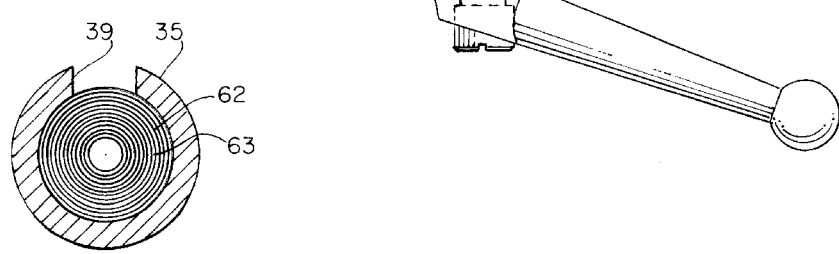
FIG. 4 is a cross-sectional view of the interface between the head housing and support shaft as shown in FIG. 3 taken through line 4—4 of FIG. 3.

As can be best seen in FIG. 2 and FIG. 3, the engagement between support shaft 60 and receiving base 20 occurs within head housing 35. Head housing 35 comprises a substantially cylindrical member through which is disposed an axially aligned cylindrical bore 36. The diameter of cylindrical bore 36 is adapted to slidably receive therein locking disc 28 and positioning sphere 62. The diameter of cylindrical bore 36 at end surface 37 is smaller than the diameter at end surface 38. As will be described in detail hereinbelow, the reduced diameter at end surface 37 prevents the inadvertent dislodgment of positioning sphere 62 from head housing 35 when locking arm 45 is activated for the purpose of securing the position of support arm 60 and receiving base 20 relative to head housing 35.

As stated hereinabove, it is an objective of the present invention to provide the means to adjustably secure the position of photographic, motion picture and video accessories which in some cases be of substantial weight. In order to meet this objective, a portion 39 of the wall of head housing 35 is removed adjacent end surface 37. The wall portion 39 which is removed is generally aligned with the center of positioning sphere 62. As will be explained in detail hereinbelow, and as shown best in FIG. 5, support shaft 60 may be locked into a position perpendicular to the axis of receiving base 20 and housing 35 for the purpose of maximizing the weight which can be supported by support shaft 60.

The ability of the present invention to firmly secure the position of support shaft 60 may be best seen by reference to FIG. 3. Locking arm 45 includes a threaded shaft 46 which engages mating threads disposed in the surface 47 of a radially oriented aperture formed in the wall of head housing 35. The tip 48 of shaft 46 is conically beveled surface and uniformly engages the mating, beveled frusto-conical surface 29 of locking disc 28 from the terminus of tip 48 to its interface with shaft 46. By rotating locking arm 45 to cause increasing engagement between tip 48 and beveled surface 29, a component of the force between tip 48 and beveled surface 29 will urge locking disc 28 into engagement with positioning sphere 62. When tip 48 is firmly seated against beveled surface 29 of lock disc 28, the relative position between positioning sphere 62 and support shaft 60 relative to housing 35 will be secured.

Figure 5:
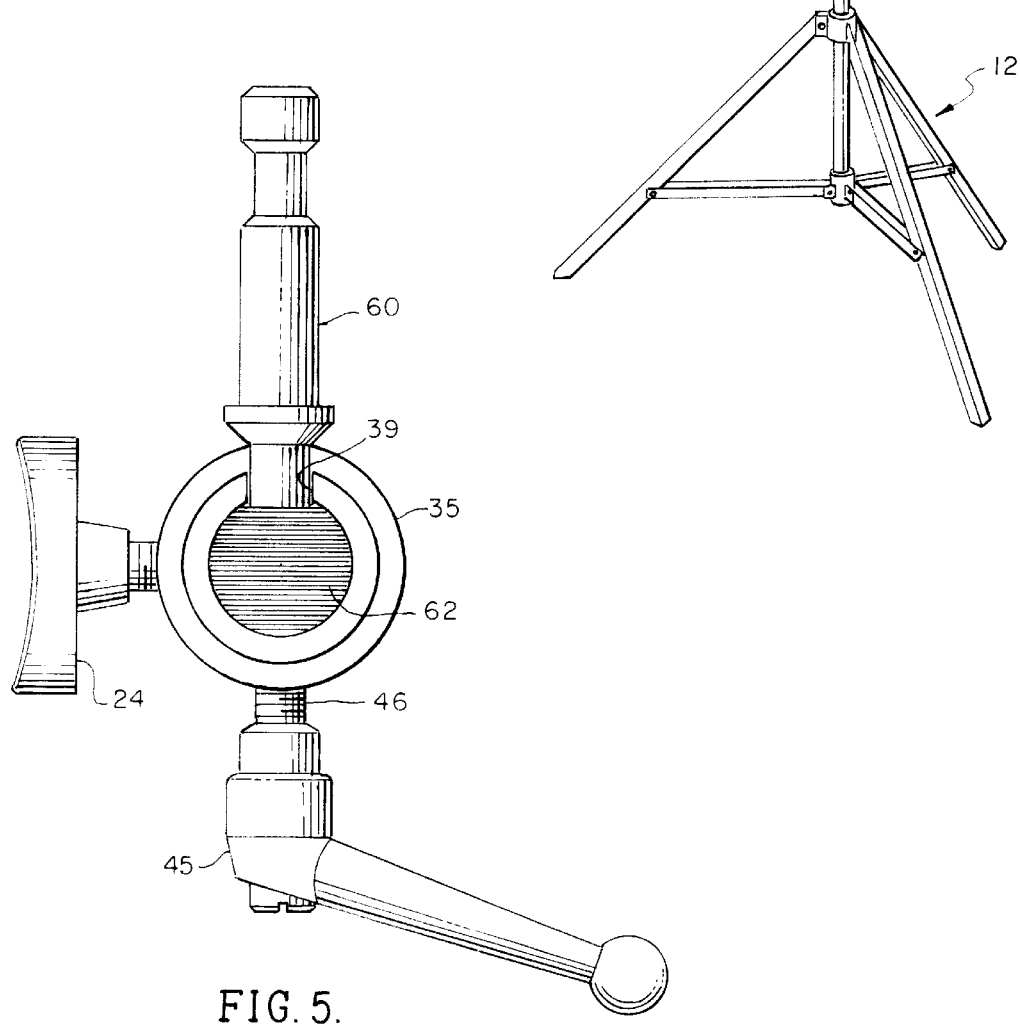
FIG. 5 is a front elevation view of the present invention showing the support shaft in a vertical, locked position.

The operation of the present invention positioning support head may be best seen by reference to FIGS. 2, 3 and 5. When locking arm 45 is rotated to separate tip 48 from beveled surface 29, the force of locking disc 28 against positioning sphere 62 will be reduced thereby permitting the movement of support shaft 60 relative to head housing 35. Through the combination of the adjustability provided by the interface between positioning sphere 62 and locking disc 28 and the adjustability of receiving base 20 about extending shaft 14, supporting shaft 60, and any accessory coupled thereto, may be positioned along a semi-spherical surface uniformly disposed about the center of positioning sphere 62.

We claim:

1. A positionable support head for coupling theatrical accessories to an equipment stand comprising:

(a) a head housing having an outer housing wall and a cylindrical bore disposed therethrough defining first and second ends, the diameter of the cylindrical bore at said second end being smaller than the diameter of the cylindrical bore at said first end, an aperture being disposed through the outer housing wall in radial alignment with the axis of said cylindrical bore;

(b) a support member including a shaft and positioning means for positioning said support member depending from an end of said shaft, said positioning means being disposed within the cylindrical bore of said housing and maintained adjacent the second end thereof, said shaft extending outwardly from the second end of said head housing;

(c) a receiving base comprising a receiving member adapted to be coupled to the equipment stand and an integral cylindrical locking disc extending from said receiving member, the diameter of said locking disc being substantially equal to the diameter of the cylindrical bore at the first end of said head housing, said locking disc having an end surface and an opposed frusto-conical surface adjacent said receiving member, said opposed, frusto-conical surface being uniformly tapered inwardly from the circumference of said locking disc to said receiving member, said locking disc being disposed through the first end of said head housing, the end surface being adapted to be adjacent the positioning means of said support member; and (d) a locking arm having a shaft coupled through the aperture in said outer housing wall, said shaft extending into a frusto-conical tip having a surface adapted to fully engage the frusto-conical surface of said locking disc whereby said locking disc is urged into firm engagement with said positioning means.

2. A positionable support head for coupling theatrical accessories to an equipment stand as defined in claim 1 wherein said positioning means comprises a positioning sphere, the diameter of said positioning sphere being equal to the diameter of the cylindrical bore at the first end thereof.

3. A positionable support head as defined in claim 2 wherein a plurality of serrations are disposed in the surface of said positioning sphere.

4. A positionable support head for coupling theatrical accessories to an equipment stand as defined in claim 3 wherein the end surface of said locking disc includes a partial spherical detent axially disposed therein.

5. A positionable support head as defined in claim 4 wherein the radius of curvature of said detent is equal to the radius of said positioning sphere.

6. A positionable support head as defined in claim 2 wherein the outer housing wall of said head housing includes a uniform indentation at the second end thereof adapted to receive the shaft of said support member, said indentation being in radial alignment with said positioning sphere whereby said shaft of said support member may be secured perpendicular to the longitudinal axis of said cylindrical bore.

7. A positionable support head for coupling theatrical accessories to an equipment stand comprising:

(a) a cylindrical head housing having first and second ends and a cylindrical bore axially disposed therethrough from said first to said second ends defining an outer wall, the diameter of the cylindrical bore at said second end being smaller than the diameter of the cylindrical bore at said first end and an aperture radially disposed through the outer wall of said housing;

(b) a support member including a cylindrical shaft and a positioning sphere having an outer surface into which a plurality of serrations are disposed, said positioning sphere axially depending from an end of said shaft, the diameter of said positioning sphere being substantially equal to the diameter of the cylindrical bore at the first end of said head housing, said cylindrical shaft being disposed through the cylindrical bore in said head housing extending from the second end thereof, said positioning sphere being adapted to be disposed adjacent the second end of said head housing;

(c) a receiving base having a receiving member adapted to be coupled to the equipment stand and a cylindrical locking disc extending from said receiving base, the diameter of said locking disc being substantially equal to the diameter of the cylindrical bore at the first end of said head housing, said locking disc having a planar end surface into which a partial spherical detent is axially disposed and an opposed frusto-conical surface being uniformly tapered from the circumference of said locking disc to said receiving member, said locking disc being disposed through the first end of said head housing and being adapted to be adjacent the positioning sphere of said support member; and (d) a locking arm having a shaft coupled through the aperture in the outer wall of said cylindrical head housing, said shaft extending into a frusto-conical tip having a surface adapted to fully engage the frusto-conical surface of said locking disc whereby said locking disc is urged into firm engagement with said positioning sphere.

8. A positionable support head as defined in claim 7 wherein the radius of curvature of said detent is equal to the radius of said positioning sphere.

9. A positionable support head as defined in claim 7 wherein the outer wall of said head housing includes an indentation at the second end thereof adapted to receive the cylindrical shaft of said support member, said indentation being in radial alignment with said positioning sphere whereby said support shaft may be secured perpendicular to the longitudinal axis of said head housing.

* * * * *